United States Patent [19]

Hashimoto

[11] Patent Number: 4,473,217

[45] Date of Patent: Sep. 25, 1984

[54] FIBER-REINFORCED RESIN COIL SPRING AND METHOD OF MANUFACTURING THE SAME

[75] Inventor: Kenji Hashimoto, Yokohama, Japan

[73] Assignee: Kato Hatsujo Kaisha, Limited, Yokohama, Japan

[21] Appl. No.: 337,728

[22] Filed: Jan. 7, 1982

[51] Int. Cl.³ .............................................. F16F 1/02
[52] U.S. Cl. ................................... 267/149; 264/165; 264/166; 264/DIG. 40; 267/166
[58] Field of Search ............... 267/149, 148, 151, 147, 267/166–167, 182, 146, 154, 158, 179, 61 R, 60, 4, 58, 62; 57/362, 249; 428/371, 364; 65/87, 86; 264/165, 166, DIG. 40

[56] References Cited

U.S. PATENT DOCUMENTS 2,323,286 6/1943 Ward ........................ 264/DIG. 40
4,260,143 4/1981 Kliger ........................ 267/166 X

FOREIGN PATENT DOCUMENTS 223965  1/1959 Australia ........................ 267/149
2401760 4/1979 France ........................... 267/148
34161   3/1977 Japan ............................ 267/149
36250   3/1977 Japan ............................ 267/149

Primary Examiner—Douglas C. Butler
Attorney, Agent, or Firm—Schwartz, Jeffery, Schwaab, Mack, Blumenthal & Koch

[57] ABSTRACT

A fiber-reinforced resin coil spring impregnated with thermosetting resin which comprises a resin-impregnated and twisted rod-shaped fiber bundle formed by bundling a plurality of fiber wire blanks made of glass or carbon, immersing the fiber bundle and twisting the rod-shaped fiber bundle in a thermosetting resin, and forming coiled twisted rod-shaped fiber bundle from the resin-immersed and twisted rod-shaped fiber bundle. Thus, the resin coil spring incorporates large elastic energy and high load withstanding capability due to the twisting of the fiber bundle.

9 Claims, 12 Drawing Figures

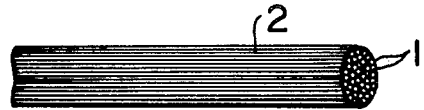 
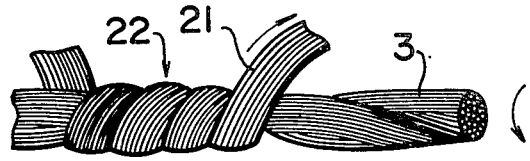
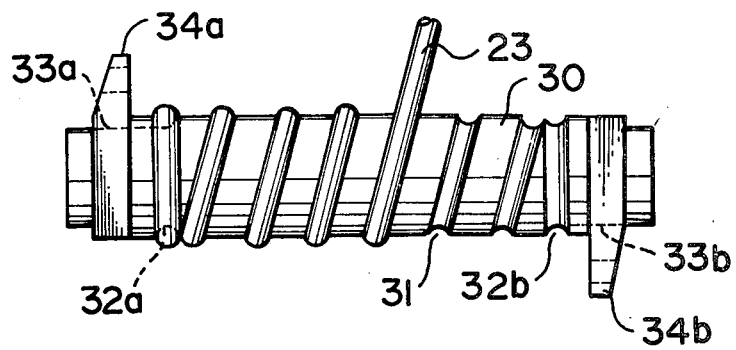
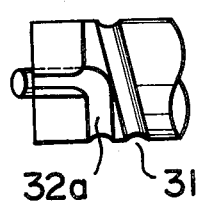 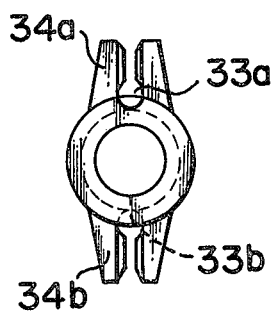

FIBER-REINFORCED RESIN COIL SPRING AND METHOD OF MANUFACTURING THE SAME

BACKGROUND OF THE INVENTION

This invention relates to a coil spring formed by utilizing a fiber wire blank and a thermosetting resin and, more particularly, to a fiber-reinforced resin coil spring impregnated with thermosetting resin and a method of manufacturing the same.

Generally, a resin spring incorporates a variety of preferable characteristics such as, for example, a light specific weight, a high strength, high corrosion resistance, chemical resistance and so forth as compared with a metallic spring, and is accordingly used at a portion in which the metallic spring cannot be conveniently used. If the elastic characteristic of the resin spring is further improved, the resin spring is desirable as compared with the metallic spring. This tendency is particularly remarkably for a vehicle which has been recently reduced in weight. Since the resin spring has, however, small elastic energy required as a spring, the conventional resin spring lacks its utility due to insufficient elasticity.

SUMMARY OF THE INVENTION

Accordingly, a primary object of this invention is to provide a fiber-reinforced resin coil spring in which all the aforementioned disadvantages and drawbacks of the conventional resin spring, and which can incorporate large elastic energy by effectively utilizing a fiber wire blank.

Another object of this invention is to provide a fiber-reinforced resin coil spring which can incorporate high load withstanding capability by twisting a fiber bundle impregnated with thermosetting resin and then forming in a coil shape.

Yet another object of this invention is to provide a fiber-reinforced resin coil spring in which elastic characteristic can be varied by the diameter of two fiber bundles twisted and immersed with thermosetting resin together with twisting in intersection and the twisting force applied thereto.

A further object of this invention is to provide a method of manufacturing a fiber-reinforced resin coil spring with a remarkably simplicity inexpensively.

Still another object of this invention is to provide a method of manufacturing a fiber-reinforced resin coil spring which can be readily conducted by allowing only both the ends of a compression spring to be in a free state at the seats of both the ends and by heating them in high temperature atmosphere.

Still another object of this invention is to provide a method of manufacturing a fiber-reinforced resin coil spring which can eliminate the steps of removing the spring from a core metal and the human labor of removing the same by heating the core metal made of thermoplastic resin for molding the resin coil spring when removing the core metal from the molded spring.

Still another object of the invention is to provide a method of manufacturing a fiber-reinforced resin coil spring which can mold the spring very readily by forming a spring seat and a hook at the core metal for molding the spring with reproducible core metal without wastefulness.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 7 is a perspective view of the rod-shaped fiber bundle of fiber wire blanks according to the present invention; FIG. 8 is a perspective view of the ordinary fiber bundle for the reference;

FIG. 9 is an explanatory side view showing the method of forming the spring wire blanks according to the present invention;

FIG. 10 is a side view showing the coiled state of the coil spring with the core metal according to the present invention; and FIGS. 11(a) and 11(b) are end views of the core metal used for manufacturing the coil spring of the present invention, wherein FIG. 11(a) is a plan view and FIG. 11(b) is side view of the core metal.

DESCRIPTION OF THE PREFERRED EMBODIMENTS

Figure 1:
FIGS. 1 through 4 are explanatory side views showing the sequence of manufacturing the fiber-reinforced resin coil spring of the present invention.

Reference is made to the drawings, particularly to FIG. 1, which shows a rod-shaped fiber bundle formed of a plurality of fiber wire blanks at the initial step of the method of manufacturing a fiber-reinforced resin coil spring according to the present invention, wherein like reference numerals designate the same or equivalent parts and components in the following views.

A plurality of fiber wire blanks made of carbon fibers or glass fibers, which will be hereinafter referred as to "fibers", are employed as the blanks of the resin coil spring of this invention, and the diameter of the fiber wire blank may be selected in accordance with the required elastic characteristic of the resin coil spring eventually produced.

As shown in FIG. 1, a plurality of fiber wire blanks 1 thus selected are made into a rod-shaped fiber bundle 2, which should have the required diameter of the coil spring. That is, in order to increase the diameter of the coil spring, the number of the diameter of the fiber wire blank 1 is increased.

A predetermined amount of methyl ethyl ketone peroxide and a predetermined quantity of cobalt naphthenate are added respectively as a hardener and a hardening accelerator to the thermosetting resin, and the mixture is stirred as a thermosetting resin solution. The thermosetting resin may, for example, include polyester or epoxy resin. The resin has, after molding, high tensile strength and excellent performance as a spring blank.

Figure 2:
Figure 3:

Subsequently, the rod-shaped fiber bundle 2 thus made as described above is immersed in the thermosetting resin solution. Thereafter, the rod-shaped fiber bundle thus immersed with the resin is subjected to a tension while being twisted clockwise or counterclockwise as shown in FIG. 2 to form the resin-immersed and twisted rod-shaped fiber bundle 3. It is noted that though the resin impregnated the rod-shaped fiber bundle 2 is slightly squeezed out by the twisting step, the content of the fiber in the rod-shaped fiber bundle is thus increased, and the rod-shaped fiber bundle accordingly incorporates higher load withstand property. Since the elastic characteristics of the rod-shaped fiber bundle have varied due to the amount of twisting, it is necessary to determine the amount of twisting the rod-shaped fiber bundle according to the desired elastic characteristic of the fiber bundle. Then, as shown in FIG. 3, a water-soluble vinyl alcohol tape 4 is wound on the rod-shaped fiber bundle in an opposite direction to the twisting direction of the resin-immersed and twisted rod-shaped fiber bundle 3 to thus form a winding fiber bundle 5. Thus, the resin-immersed and twisted rod-shaped fiber bundle 3 is prevented from being untwisted loosely.

Figure 4:
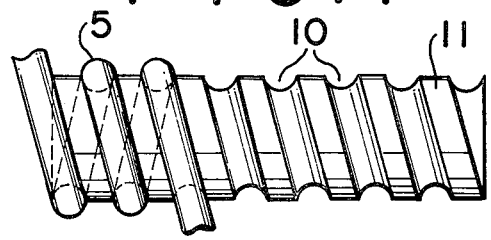

Thereafter, the winding fiber bundle 5 thus wound with the water-soluble vinyl alcohol tape 4 is wound along the coil-shaped groove 10 formed on a core metal 11 made of metal or resin on which a coil-shaped groove 10 of a predetermined pitch is formed as shown in FIG. 4, thereby forming the coil-shaped fiber bundle. It is noted that the water-soluble polyvinyl alcohol tape 4 is being wound on the rod-shaped fiber bundle when the fiber bundle 5 is wound on the core metal 11.

As to the winding direction of the rod-shaped fiber bundle, in the above coiling step, the fiber bundle is wound in the opposite direction to the twisting direction of the resin-immersed and twisted rod-shaped fiber bundle 3 so as to obtain a compression spring and the fiber bundle is wound in the same direction as the twisting direction of the rod-shaped fiber bundle in order to form the coil spring having high load withstanding property.

After the rod-shaped fiber bundle is wound on the core metal 11 in predetermined number of turns, both the ends of the fiber bundle are cut, and fitted suitably so that both the ends of the fiber bundle may neither open nor move to the core metal 11 by a jig.

Then, the rod-shaped fiber bundle thus wound is heated to approximately 100° C. for a predetermined time.

The thus wound fiber bundle 5 is solidified by this heating, and a coil spring formed along the coiled groove 10 of the core metal 11 is thus molded subsequently, the coiled spring thus solidified is removed from the core metal 11, and is dipped in water and allowed to stand for a predetermined time. Thus, the water-soluble vinyl alcohol tape 4 is dissolved in the water and thus removed to obtain the fiber-reinforced resin coil spring as a product.

Figure 5:
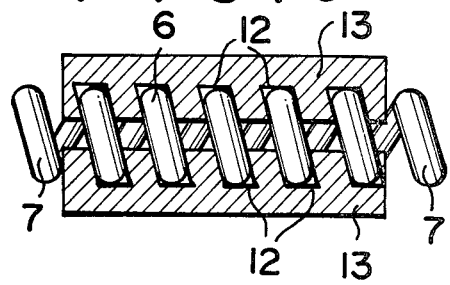
FIG. 5 is an explanatory side sectional view showing the method of molding the seat of the compression spring constructed according to the present invention.

Seats to be formed at both ends of the compression spring thus formed is readily formed according to the following method. That is, the heating step of the fiber bundle described above is conducted at relatively low temperature, the twisted rod-shaped fiber bundle 2 is temporarily fitted to obtain a preformed coil spring 6 shown in FIG. 5, and such a coil spring 6 is fixed so that one turn of both the ends 7, 7 of the preformed coil spring 6 may become in free state by employing stationary jigs 13, 13 in which coiled slots 12, 12 are formed in such a manner that the coil spring 6 is engaged internally in the slots formed in the split jigs to be divided into upper and lower jigs.

Figure 6:
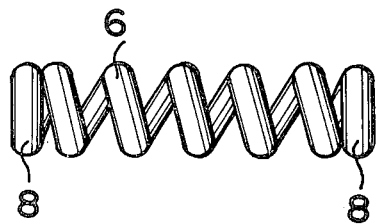
FIG. 6 is a side view of the compression spring manufactured according to the method shown in FIG. 5.

When the coil spring 6 is then allowed to stand in relatively high temperature atmosphere in this engaged state, the free ends 7, 7 of the coil spring 6 are internally shrunk to form the seats 8, 8 at both ends of the coil spring 6 as shown in FIG. 6. The seats 8, 8 of the coil spring 6 are thus formed so that the residual twisting stress is applied to the coil spring 6 by twisting the rod-shaped fiber bundle 2, temporarily fixed via the resin by the above low temperature heating, and the coil spring 6 thus formed is allowed to stand in the high temperature atmosphere, thereby releasing the residual stress to cause the recoiling of the twisting thereat. Accordingly, since the twisting is thus recoiled, the free ends 7, 7 of the coil spring 6 are pulled toward the center of the spring with the result that the pitch of the coil spring is reduced intimately to thus form the seats 8, 8 at both ends 7, 7 of the coil spring 6. When the resin coil spring is completely hardened in the high temperature atmosphere, the pitch of the coil spring 6 may not be varied again even in the high temperature atmosphere.

According to the experiments, a coil spring product having 5 mm of the diameter of the coil and 4, 5 of the number of turns was produced with the glass rod-shaped fiber bundle thus formed according to the method as was described above. When the spring constant of the coil spring thus produced was measured, it was 0.79. On the other hand, the coil spring was also produced with the same dimensional size as the above coil spring without twisting the resin-impregnated rod-shaped fiber bundle but linearly. When the spring constant of the latter coil spring was measured, it was 0.32.

The coil spring having the same dimensional sizes as above coil spring was produced in the same manner as above by using the carbon rod-shaped fiber bundle. When the spring constant was measured, it was approximately twice as high as the glass rod-shaped fiber bundle thus produced.

Another preferred embodiment of the fiber-reinforced resin coil spring of the present invention will be described with reference to FIG. 7 in the same manner as shown in FIG. 1. A plurality of fiber wire blanks 1 made of carbon fiber or glass fiber or the like are bundled into a rod-shaped fiber bundle 2.

On the other hand, as shown in FIG. 8, a plurality of fiber wire blanks 1 are aligned in a flat plate shape to obtain a flat fiber bundle 20.

The above rod-shaped fiber bundle 2 and the flat fiber bundle 20 are respectively dipped and immersed in the thermosetting resin solution obtained as described above, thereby obtaining the resin-immersed rod-shaped fiber bundle and the flat resin-impregnated ordinary fiber bundle 21. Then, the resin-impregnated rod-shaped fiber bundle is twisted as shown and described in FIG. 2 in a manner as shown in FIG. 9 to form a resin-impregnated and twisted rod-shaped fiber bundle 3. Further, the flat resin-impregnated fiber bundle 21 is wound in opposite direction to the twisting direction to form a spring wire blank 22 having a predetermined diameter of the coil spring.

When the resin-impregnated and twisted rod-shaped fiber bundle 3 thus twisted is wound with the flat fiber bundle 21 in opposite direction to the twisting direction thereof, the fiber bundle 21 thus wound counteracts the internal stress untwisting the fiber bundle 3 thus twisted. Accordingly, the residual stress is not manifested externally. Since both the fibers 3 and 21 becomes in intersecting state, their twisting elastic moduli become large, and the spring wire blank 22 having large load withstand property can be obtained.

Subsequently, in order to retain the shape of the wire blank of the above spring wire blank 22, the water-soluble polyvinyl alcohol tape is wound in the same manner as was described with reference to FIG. 3 thereon.

Referring to FIG. 10, the spring wire blank 22 thus formed is then wound on the coiled groove 13 formed at a predetermined pitch on the core metal 30 to thus produce a coiled spring. The core metal 30 has a coiled groove 31 formed at a predetermined pitch, flat grooves 32a, 32b formed substantially on the semicircumferential surfaces at both ends of the groove 31, and pressing grooves 33a, 33b curved externally perpendicularly from the flat grooves 32a, 32b, and further pressing projections 34a, 34b split to nip and hold the spring wire blank 22 vertically outside the pressing grooves 33a, 33b, respectively so as to prevent the removal of the wire blank 22.

Thus, the blank 22 is inserted and held in the pressing groove 33a of the core metal at the end thereof from the top of the splits of the one pressing projection 34a, then wound on the flat groove 32a, the coiled groove 31 and the flat groove 32b sequentially, and finally inserted and held from the split of the pressing projection 34b to the pressing groove 33b. Then, the end of the blank 22 are cut, and fixedly wound on the core metal.

It is noted that the material of the core metal 30 is preferably made of thermoplastic resin such as, for example, soft polyethylene, though it may also be made of metal similarly to the core metal 11 shown in FIG. 4.

Subsequently, the core metal 30 thus wound with the spring wire blank 22 as described above is heated at a temperature lower than the melting point of the soft polyethylene. Thus, the thermosetting resin of the spring wire blank 22 is hardened, and the coil spring formed along the coiled groove 31 of the core metal 30 is formed fixedly. Thereafter, the coil spring thus formed is inserted into a high temperature centrifugal separator, and heated to a temperature higher than the melting point of the soft polyethylene such as 120° to 130° C. forming the core metal 30. Then, the core metal 30 is molten. When the centrifugal separator is revolved at the time when the core metal 30 is molten, the core metal 30 is separated circumferentially with the coil spring retained as it is. The soft polyethylene thus separated may be molded again into the original shape by an injection molding.

When the parts corresponding to the pressing grooves 33a, 33b of the core metal 30 at the coil spring thus formed are cut in the same manner as was described with reference to FIG. 6, the parts formed at the flat grooves 32a, 32b are thus formed in seats as designated by 8 in FIG. 6, thereby obtaining the compression coil spring of a final product.

In order to produce a tension coil spring, grooves corresponding to the hooks of the spring are formed at the ends of the core metal readily.

According to the experiments as one example of the coil spring described above, when the spring constant of the coil spring made of carbon fiber was measured with 5.2 mm diameter and 4 turns, it had a spring constant approximately 4 times as high as the coil spring of straight fiber without twisting.

It should be understood from the foregoing description that since according to the thermosetting resin coil spring thus formed and the method of manufacturing the same in accordance with the present invention with reference to FIGS. 1 through 6 the spring coil is formed in coil shape by twisting the fiber bundle immersed with the thermosetting resin, it can obtain high load withstand property due to the twisting, and the manufacturing method thereof can be very simply conducted inexpensively. It should also be appreciated that since the seats of the both ends of the compression spring formed according to the present invention by allowing only both the ends of the coil spring in free state and by heating them in high temperature atmosphere, they can be readily formed.

It should also be understood that since according to the fiber-reinforced resin coil spring formed with reference to FIGS. 7 through 11 two fiber bundles immersed with the thermosetting resin are twisted in intersection, it can incorporate high withstand capability against the load and the spring constant or elastic characteristic thereof can be varied according to the diameter of the wire blank and the twisting force.

It should also be appreciated that since the fiber-reinforced resin coil spring of the present invention formed by the core metal is molded with the core metal made of themoplastic resin, the core metal can be readily separated by heating the core metal, allowing to reduce the steps of removing the core metal from the coil spring and eliminate the labor of removing the same, and since the seats and the hooks are formed on the core metal in the manufacturing step of the coil spring, the latter may be remarkably readily formed with the core metal reproducible to the original core metal even after heating and removing without loss.

What is claimed is:

1. A method of manufacturing a fiber-reinforced resin coil spring comprising the steps of:
   bundling a plurality of fiber wire blanks made of glass or carbon to form a fiber bundle,
   immersing said fiber bundle in thermosetting resin to form a resin-impregnated rod-shaped fiber bundle,
   twisting said rod-shaped fiber bundle to form a resin-impregnated and twisted rod-shaped fiber bundle,
   winding a water soluble polyvinyl alcohol tape on said resin-impregnated and twisted rod-shaped fiber bundle to form a winding fiber bundle,
   winding said winding fiber bundle along the coiled groove formed on a core metal having the coiled groove formed thereon,
   heating the wound fiber bundle, thereby solidifying the wound fiber bundle on said core metal, and
   removing the solidified fiber bundle from said core metal.

2. The method of manufacturing a fiber-reinforced resin coil spring according to claim 1, wherein said core metal is formed of thermoplastic resin to remove the wound fiber bundle from said core metal, and heating the resin to melt and remove the wound fiber bundle from the core metal.

3. A method of manufacturing a fiber-reinforced resin coil spring comprising the steps of:
   bundling a plurality of fiber wire blanks made of glass or carbon to form a fiber bundle,
   immersing said fiber bundle in thermosetting resin to form a resin-impregnated rod-shaped fiber bundle,
   twisting said rod-shaped fiber bundle to form a resin-impregnated and twisted rod-shaped fiber bundle,
   aligning a plurality of fiber wire blanks made of glass or carbon in flat state to form a flat fiber bundle,
   immersing thermosetting resin in said flat fiber bundle to form a resin-impregnated flat fiber bundle,
   winding said resin-impregnated flat fiber bundle in opposite direction to the twisting direction thereof on said resin-impregnated and twisted rod-shaped fiber to obtain a spring wire blank,
   winding a water soluble polyvinyl alcohol tape on said spring wire blank, winding said wound spring wire blank on the coiled groove formed on a core metal having the coiled groove formed thereon, heating said wound spring wire blank, thereby solidifying the spring wire blank wound on said core metal, removing said solidified spring wire blank, and dissolving said water soluble polyvinyl alcohol tape in water.

4. The method according to claim 3, wherein said core metal is formed of thermoplastic resin to remove the spring wire blank solidified by said heating from said core metal, thereby heating said resin to melt and remove said core metal from the spring wire blank.

5. The method according to any of claims 1, 2, 3 or 4, wherein said core metal has seats or hooks formed at both ends of coiled grooves at predetermined pitch.

6. A method of manufacturing a fiber-reinforced resin coil spring comprising the steps of:

bundling a plurality of fiber wire blanks made of glass opr carbon to form a fiber bundle, immersing said fiber bundle in thermosetting resin to form a resin-impregnated shaped fiber bundle, twisting said rod-shaped fiber bundle to form a resin-impregnated and twisted rod-shaped fiber bundle, winding a water soluble polyvinyl alcohol tape on said resin-impregnated and twisted rod-shaped fiber bundle to form a winding fiber bundle, winding said winding fiber bundle along the coiled groove formed on a core metal having the coiled groove formed thereon, heating the wound fiber bundle at low temperature, thereby semisolidifying the wound fiber bundle on said core metal, removing the semisolidified fiber bundle from said core metal to obtain a semiformed coil spring, holding said semiformed coil spring with stationary jigs in such a manner that only substantially one turn of both the ends of said coil spring are in free state heating said coil spring thus held at high temperature, thereby shrinking the free state parts to form seats thereat.

7. A fiber-reinforced resin coil spring containing a core element which comprises a rod-shaped fiber bundle comprised of a plurality of substantially parallel, thermosetting resin-impregnated glass or carbon wire blanks, said rod-shaped bundle being twisted axially around a central axis of said rod-shaped bundle.

8. A fiber-reinforced resin coil spring as in claim 7, wherein said rod-shaped bundle is coiled in a direction opposite to the direction in which said rod-shaped bundle is twisted axially.

9. A fiber-reinforced resin coil spring as in claim 7, further comprising a flat bundle comprising a plurality of substantially parallel, thermosetting resin-impregnated glass or carbon wire blanks, said flat bundle being wound around said rod-shaped bundle in a direction opposite to the direction in which said rod-shaped bundle is twisted axially.

* * * * *